July 20, 1965  E. M. GREER  3,195,577
FLUID PRESSURE ACCUMULATOR
Filed Nov. 1, 1961
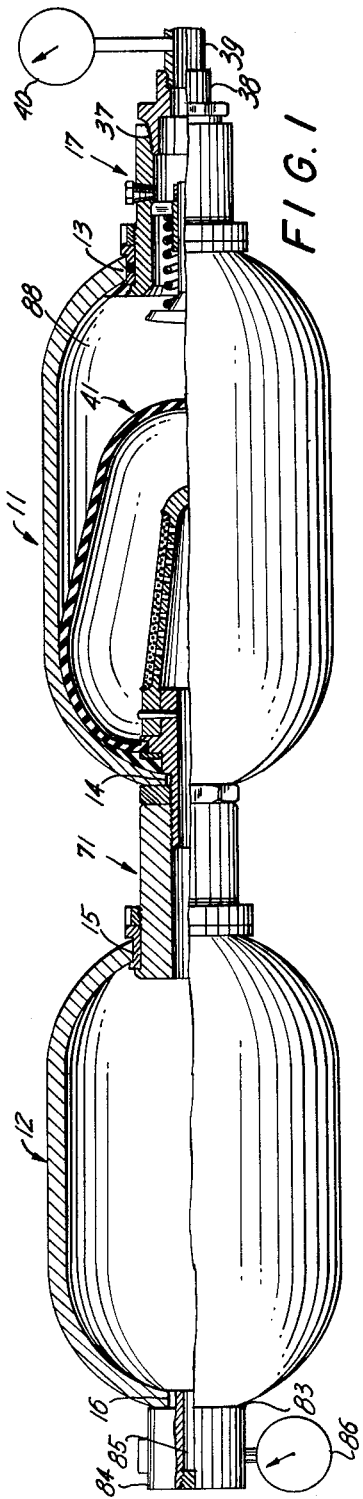
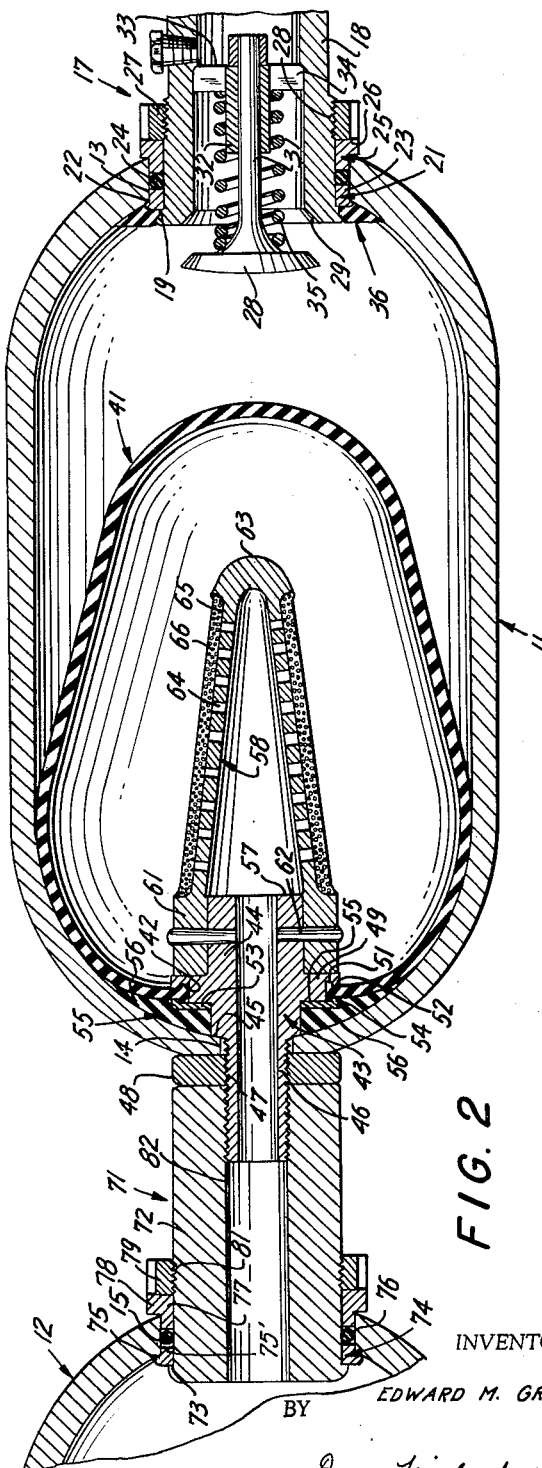
INVENTOR.
EDWARD M. GREER
BY
Dean, Fairbank & Hirsch
ATTORNEYS

3,195,577
FLUID PRESSURE ACCUMULATOR
Edward M. Greer, Beverly Hills, Calif., assignor to Greer Hydraulics, Inc., Los Angeles, Calif., a corporation of New York
Filed Nov. 1, 1961, Ser. No. 149,358
3 Claims. (Cl. 138—30)

This invention relates to the art of fluid pressure devices, more particularly of the type that comprises a rigid container to be filled with fluids, usually oil and gas under pressure and having a deformable partition or bladder intervening between such fluids.

As conducive to an understanding of the invention, it is noted that the oil capacity of a pressure accumulator at a given working pressure is the volume available between the container wall and the compressed bladder. Thus, if the pre-charge pressure in the bladder is relatively close to the desired final working pressure of the system and the original quantity of pre-charged gas in the bladder is relatively small, it is apparent that such small quantity of gas will quickly be compressed to the final working pressure after only a relatively small quantity of oil has been pumped into the accumulator which may be less than the desired quantity. Consequently, in normal use, the pre-charge pressure in the bladder is generally relatively small as compared to the desired final working pressure so that the desired quantity of oil may be charged into the accumulator at a pressure not exceeding the desired final working pressure. As a result, due to the small quantity of gas compressed, while fluid under pressure is being discharged from the accumulator the working pressure will quickly drop to the original relatively low pre-charge pressure. This rapid drop in working pressure in many instances will cause malfunctioning of the hydraulic equipment being actuated.

It is to be noted that where a pressure device of the above type, as for instance a pressure accumulator, is charged with gas and oil under pressure and the oil port is connected through a line to the equipment to be operated as well as to a pump for supplying oil under pressure to both the accumulator and the system, assuming that the line pressure is a given value, a pressure gauge connected to the oil port of the accumulator will indicate such value.

If there should be a leak from the gas side of the accumulator, causing the volume of gas and the pressure thereof to drop considerably the accumulator would not be able to deliver sufficient oil at the desired line pressure. Assuming that the line pressure indicated on the pressure gauge is still at the desired value, there would be no indication to an attendant of such gas leak, which could have serious consequences.

If an attempt should be made to connect a gas pressure gauge to the gas side of the accumulator, since the pressures on both sides of the deformable partition or bladder will be equal, the gas pressure gauge would always indicate the line pressure even if, due to leakage, there was only a relatively small quantity of gas under pressure remaining, which quantity of gas could not supply the fluid under pressure when desired for any appreciable time.

It is accordingly among the objects of the invention to provide an equipment including a pressure vessel comprising a rigid container that is filled with two fluids such as oil and gas under pressure and having a deformable partition intervening between such fluids, which equipment will provide a dependable and accurate indication of the gas pressure existing, which pressure will be correlated with the quantity of gas remaining so that an attendant will be apprised of the ability of the equipment to deliver the desired quantity of oil under pressure for a desired period of time and in which the variation between the system working pressure and the pre-charge pressure when the oil in the accumulator has been substantially discharged, will be relatively small.

According to the invention, these objects are accomplished by the arrangement and combination of elements hereinafter described and more particularly recited in the claims.

In the accompanying drawings in which is shown one of various possible embodiments of the several features of the invention, FIG. 1 is a longitudinal view of the equipment partly in cross section, and FIG. 2 is a fragmentary view similar to FIG. 1 on an enlarged scale.

Referring now to the drawings, the equipment comprises a pair of containers or pressure vessels 11, 12, each preferably of strong, rigid material such as steel, cast aluminum or the like, capable of withstanding high pressure. The containers 11, 12 may be cylindrical or cylindrospherical as shown, and each has a pair of longitudinally aligned ports 13, 14 and 15, 16 extending through the ends thereof respectively.

Although port 13 of container 11, through which a fluid such as oil under pressure is designed to pass, may be controlled in any suitable manner, in the embodiment herein shown, it is preferred to use the general construction shown in United States Patent No. 2,469,171, dated May 3, 1949. With the construction shown in this patent, the closure assembly 17 affixed in said port 13 may be removed without likelihood of injury to the mechanic.

As shown, this assembly desirably comprises a housing 18, preferably a tubular member which desirably has an external annular shoulder 19 at the inner end thereof of outer diameter less than that of port 13. A locking member 21, illustratively a ring of greater outer diameter than said port 13 and deformable to permit its insertion thereinto, encompasses said tubular member and is seated on the rim 22 of port 13, the inner diameter of said ring 21 being less than the outer diameter of shoulder 19 so that said shoulder may seat on said ring.

The ring 21 has a cylindrical portion 23 integral therewith which extends between the wall of port 13 and the tubular member 18 to minimize lateral displacement of said tubular member 18.

Encompassing said tubular member 18 and in juxtaposition with said port 13 is a rubber gasket 24 which, when compressed, serves effectively to prevent leakage between the wall of port 13 and the outer wall of tubular member 18.

To compress said gasket 24 and to retain the tubular member 18 in port 13, a sleeve 25 is provided, encompassing tubular member 18 and positioned between the wall of port 13 and the tubular member 18. The sleeve 25 has an external annular flange 26 and a nut 27 screwed on a correspondingly threaded portion 28 of tubular member 18, when tightened, reacts against flange 26 to move sleeve 25 inwardly.

This will both compress the gasket 24 and move the tubular member 18 outwardly so that the tubular member 18, the ring 21, the sleeve 25 and the nut 27 will be rigidly secured in position with respect to port 13.

Desirably positioned in said tubular member 18 is a poppet valve comprising a valve head 28 adapted to seat on the beveled mouth 29 of tubular member 18 and having a stem 31 preferably formed integral therewith.

Stem 31 is slidingly mounted in bearing sleeve 32 desirably formed integral with and extending axially of a disc 33 mounted in the bore of tubular member 18, said disc having a plurality of openings 34 therethrough to permit the passage of fluid, said valve head being normally retained in open position by means of a coil spring 35 encompassing stem 31 between head 28 and disc 33.

Desirably, a resilient annulus 36 encompasses the inner end of tubular member 18 and is secured to the locking ring 21. The outer diameter of the annulus 36 is greater than that of the ring 21 so that it will overlap the latter. The undersurface of such overlapping portion of the annulus 36 is desirably curved to conform to the contour of the inner surface of the container 11 adjacent the periphery of port 13 for seating of such curved portion of the annulus thereon.

The outer end of the tubular member 18 is desirably internally threaded as at 37 to receive the correspondingly threaded end of a fitting 38 to which the line 39 from the equipment being operated is connected, an oil pressure gauge 40 being connected to said line.

Positioned in the container 11 is a deformable partition, illustratively a collapsible and expansible bladder 41, desirably of resilient material such as rubber or synthetic plastic of like physical characteristics, which in distended but substantially unstretched condition is smaller than the cavity of the container 11 and has its longitudinal axis aligned with the ports 13, 14. As shown, the bladder is substantially conical in contour along its length and has a mouth at the larger diameter end thereof, said mouth having an enlarged rim 42 defined by an annular flange extending in a plane parallel to the longitudinal axis of the bladder 41.

Means are provided to retain the bladder in said container 11. To this end as shown, a cylindrical sleeve 43 is provided of enlarged outer diameter at one end as at 44 defining a beveled annular shoulder 45 adapted to seat against the inner surface of container 11 adjacent the periphery of port 14.

The reduced diameter portion 46 of the sleeve 43 extends through port 14 with but slight clearance and is externally threaded as at 47 to receive a locking nut 48.

The enlarged diameter portion 44 of sleeve 43 in container 11 has an external annular flange 49 which has an annular outstanding lip 51 with a rim 52 formed integral therewith.

Encompassing the enlarged portion 44 of sleeve 43 is a ring member 53 which has an annular rim 54 formed integral therewith. With the ring 53 resting against the surface 55 of flange 49 the juxtaposed rims 52 and 54 will define an annular cavity to accommodate the rim 42 of the mouth of the bladder 41, the width of said cavity being less than that of said rim 42 so that the latter will be compressed securely to be retained in place in the manner to be described.

Bonded to the ring member 53 is an annulus 55 of resilient material, the outer periphery 56 of which extends outwardly beyond said rim 54. The annulus has a curved outer surface 56 designed to be compressed against the correspondingly curved inner surface of the container adjacent port 14 thereof, and the thickness of the annulus is greater than the distance between the ring 53 and the opposed portion of the container wall so that when the nut 48 is tightened, the annulus will be compressed urging the ring 53 against flange 49 to compress the rim 42 of the bladder.

As a result, the rim 42 of the bladder will be dependably retained in position and a dependable seal will be provided by the annulus 55 to prevent leakage from the port 14.

Encompassing the sleeve 43 between the flange 49 and the inner end 57 of the sleeve 43 is a hollow guide member 58 of rigid material. The guide member extends axially of the container 11 and preferably is substantially conical in contour along its length which is less than that of the container 11 and that of the bladder 41. The larger diameter end 61 of the guide member is cylindrical so that it may encompass the end 57 of sleeve 43 and is secured thereto as by pins 62. The guide member has a plurality of perforations 64 therethrough along its side wall and has an annular recess 65 in the outer surface of said side wall to accommodate a sleeve 66 of porous material such as sintered bronze, for example.

Thus, fluid such as air or gas under pressure may readily pass through the perforations 64 and the porous sleeve 66 to charge the bladder 41 in conventional manner, yet when said bladder is compressed in operation, the guide member will prevent undue collapse of the bladder which might cause sharp folds therein and rupture of the bladder with resultant failure of the equipment.

The container 12 has a fitting 71 mounted in its port 15. The fitting 71 comprises a tubular member 72 which desirably has an external annular shoulder 73 at the inner end thereof of diameter less than that of port 15. A locking member 74 illustratively a ring of greater outer diameter than said port 15 and deformable to permit its insertion thereinto, encompasses said tubular member and has an annular flange seated on the rim 75 of port 15, the inner diameter of said ring 74 being less than the outer diameter of shoulder 73 so that said shoulder may seat on said ring. The ring 74 has a cylindrical portion 75' which extends between the wall of port 15 and the tubular member to limit the lateral displacement thereof.

Encompassing said tubular member 72 and in juxtaposition with said port 15 is a rubber gasket 76 which, when compressed, serves effectively to prevent leakage between the wall of port 15 and the outer wall of tubular member 72.

To compress said gasket and to retain the tubular member in port 15, a sleeve 77 is provided encompassing tubular member 72 and positioned between the wall of port 15 and the tubular member 72. The sleeve has an external annular flange 78 and a nut 79 screwed on a correspondingly threaded portion 81 of tubular member 72, when tightened, reacts against flange 78 to move sleeve 77 inwardly.

This will both compress the gasket 76 and move the tubular member 72 outwardly so that the tubular member 72, the sleeve 77 and the nut 79 will be rigidly secured in position with respect to port 15.

As this assembly is similar to that shown in Patent No. 2,469,171, it will not be further described.

The bore 82 of tubular member 72 is internally threaded to receive the correspondingly threaded portion of sleeve 43 so that the two containers will be securely retained in axial alignment.

The port 16 of container 12 has secured therein as by welding at 83 the cylindrical portion of a fitting 84 to which a source of gas under pressure may be applied. The fitting 84 has a suitable valve (not shown) to control the passage of gas under pressure through the bore 85 of the fitting into container 12 and a gas pressure gauge 86 is connected to said bore 85.

In the operation of the equipment shown, the container 12 is pre-charged through fitting 84 with gas to a pressure of say 2,500 p.s.i. Such gas under pressure will pass through bore 82 of tubular member 72 and through sleeve 43 into guide member 58 and thence through the perforations 64 thereof and through porous sleeve 66 to inflate the bladder 41 and cause valve head 28 to seat to close the oil port.

Thereupon the valve controlling fitting 84 is closed, the gauge 86 indicating the pre-charge pressure in container 12 and in bladder 41 to be 2,500 p.s.i. Fluid such as oil under pressure is forced by the pump (not shown) through line 39 and assembly 17 into the oil chamber 88 of the container 11 and the bladder 41 will be compressed, the pressure of the gas in the compressed bladder and in the container 12 increasing to say 3,000 p.s.i. depending upon the line pressure. At this time both gauges 40 and 86 will indicate such pressure of 3,000 p.s.i.

The unit is now ready to operate the equipment connected to line 39.

In the event of leakage of the gas under pressure from bladder 41 and container 12, assuming that the line pressure of 3,000 p.s.i. is maintained constant by the pump, the bladder will be further compressed until it presses against the porous sleeve 66 sealing the latter so that the gas in container 12 is no longer subject to the effect of the line pressure.

As a result, although the gauge 40 will still indicate the line pressure of 3,000 p.s.i., the gauge 86 will indicate the actual gas pressure in container 12 independently of the line pressure since movement of the bladder to compress the gas therein is restrained by porous sleeve 66.

As a result of the arrangement herein described, in the event of further leakage of gas, since this would be indicated by the drop of pressure on gauge 86, there would be a clear indication to an attendant of such leakage.

Since the attendant would be immediately aware of the drop of gas pressure, he could take the necessary steps to alleviate the problem either by switching to an auxiliary unit or by causing additional gas under pressure to be pumped into container 12 to raise the gas pressure to the desired value.

The gas pressure required to produce sufficient quantity of oil under pressure in a given period, in the event say of pump failure or the need for a rapid flow, can readily be determined based on the volume of the container 12, for example. This container is relatively large in the embodiment shown, so that relatively small leakage even for a considerable period will not substantially reduce such gas pressure.

In normal operation of the device since the precharge pressure was close to the working pressure of 3,000 p.s.i., even when substantially all of the oil has been discharged and the bladder has expanded to its pre-charge condition, the oil will still be under a pressure of approximately 2,500 p.s.i. so that the hydraulic equipment being operated will be subjected to fluid under a pressure close to the optimum working pressure therefor.

As many changes could be made in the above construction and many apparently widely different embodiments of this invention could be made without departing from the scope of the claims, it is intended that all matter contained in the above description, or shown in the accompanying drawings shall be interpreted as illustrative and not in a limiting sense.

Having thus described my invention, what I claim as new and desire to secure by Letters Patent of the United States is:

1. A pressure equipment comprising a pair of rigid containers each having a pair of ports, one of said containers having a deformable bladder therein having a mouth, said bladder intervening between the ports thereof and defining a gas chamber and a liquid chamber on the respective sides thereof and in communication with the respective ports of the associated container, means to isolate the fluid pressures in the respective containers from each other, said means comprising a porous guide member in said gas chamber defined by said bladder and in communication with the associated port, said guide member being hollow and substantially conical along its length, the wall of said guide member being perforated and a porous sleeve encompassing said wall over the perforations thereon, said port defining a gas port, a sleeve extending axially through said gas port into said first named container and through one of the ports of the other container, means to retain said sleeve in fixed position with respect to said gas port and said port of said other container, said gas port and said port on the other container being axially aligned, means to clamp the mouth of said bladder to the portion of said sleeve extending into said first named container, said porous guide member having a mouth at one end secured to the inner end of said sleeve and extending axially of said first container into said bladder, whereby when gas under pressure is forced into the other port of said other container it will charge said other container and will pass through said porous guide member into said gas chamber to extend said bladder and when said bladder is compressed against said porous guide member, the fluid pressure in said respective containers will be isolated from each other.

2. A pressure equipment comprising a pair of rigid containers each having a pair of ports, one of said containers having a deformable bladder therein having a mouth, said bladder intervening between the ports thereof and defining a gas chamber and a liquid chamber on the respective sides thereof and in communication with the respective ports of the associated container, means to isolate the fluid pressures in the respective containers from each other, said means comprising a porous guide member in said gas chamber defined by said bladder and in communication with the associated port, said guide member comprising an elongated sleeve substantially conical along its length, said sleeve being open at its larger diameter end and closed at the smaller diameter end, said open end defining the mouth thereof, said sleeve having a plurality of perforations through the wall thereof, and having an annular recess in its outer surface through which said perforations extend, a porous sleeve encompasses said elongated sleeve and positioned in said recess, said port defining a gas port, a sleeve extending axially through said gas port into said first named container and through one of the ports of the other container, means to retain said sleeve in fixed position with respect to said gas port and said port of said other container, said gas port and said port of the other container being axially aligned, means to clamp the mouth of said bladder to the portion of said sleeve extending into said first named container, said porous guide member having its mouth secured to the inner end of said sleeve and extending axially of said first container into said bladder, whereby when gas under pressure is forced into the other port of said other container it will charge said other container and will pass through said porous guide member into said gas chamber to extend said bladder and when said bladder is compressed against said porous guide member, the fluid pressure in said respective containers will be isolated from each other.

3. An accumulator comprising a container of rigid material having a pair of ports, a deformable bladder in said container having a mouth, said bladder intervening between said ports and defining a gas chamber and a liquid chamber on the respective sides thereof, a guide member comprising an elongated hollow sleeve substantially conical along its length, said sleeve being open at its larger diameter end and closed at its smaller diameter end, said sleeve having a plurality of perforations through the wall thereof and having an annular recess in its outer surface through which said perforations extend, a porous sleeve encompassing said elongated sleeve and positioned in said recess, a sleeve extending through one of said ports into said container, the open end of said perforated sleeve being secured to the end of said sleeve in said container to position said guide member axially of said bladder and means to retain the mouth of said bladder in fixed position with respect to said port through which said sleeve extends.

References Cited by the Examiner
UNITED STATES PATENTS

| | | | |
|---|---|---|---|
| 2,354,201 | 7/44 | Dand et al. | 138—30 |
| 2,697,451 | 12/54 | Knauth | 138—30 |
| 2,738,227 | 3/56 | Havens | 222—386.5 |
| 2,877,801 | 3/59 | Mercier | 138—30 |
| 2,904,077 | 9/59 | Trumper | 138—30 |

EDWARD V. BENHAM, *Primary Examiner.*